United States Patent
Baratloo et al.

(10) Patent No.: US 8,788,336 B1
(45) Date of Patent: Jul. 22, 2014

(54) ESTIMATING COST AND/OR PERFORMANCE INFORMATION FOR AN ADVERTISEMENT IN AN ADVERTISING SYSTEM

(75) Inventors: Arash Baratloo, Mountain View, CA (US); Monika H. Henzinger, Corseaux (CH); Ming-Yee Iu, Mountain View, CA (US); Wilburt Labio, Cupertino, CA (US); Zhe Qian, Sunnyvale, CA (US); Keith Randall, Mountain View, CA (US); Robert J. Stets, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 2763 days.

(21) Appl. No.: 10/749,115

(22) Filed: Dec. 30, 2003

(51) Int. Cl.
*G06Q 30/00* (2012.01)
(52) U.S. Cl.
USPC .................................... 705/14.41

(58) Field of Classification Search
None
See application file for complete search history.

(56) References Cited

U.S. PATENT DOCUMENTS

| | | | |
|---|---|---|---|
| 5,905,975 A | 5/1999 | Ausubel | |
| 6,243,691 B1 | 6/2001 | Fisher et al. | |
| 7,085,682 B1 * | 8/2006 | Heller et al. | 702/186 |
| 7,092,901 B2 * | 8/2006 | Davis et al. | 705/26 |
| 7,177,832 B1 | 2/2007 | Semret et al. | |
| 7,225,151 B1 | 5/2007 | Konia | |
| 2001/0034637 A1 * | 10/2001 | Lin et al. | 705/10 |
| 2002/0082977 A1 * | 6/2002 | Hammond et al. | 705/37 |
| 2003/0236739 A1 | 12/2003 | Borgeson et al. | |

* cited by examiner

*Primary Examiner* — Daniel Sorkowitz
(74) *Attorney, Agent, or Firm* — Fish & Richardson P.C.

(57) ABSTRACT

An advertiser may be provided with fast and accurate estimates of the future cost and/or performance information for one or more actual or hypothetical ads (generally referred to as "proto-ads"). Past auction information may be used to simulate auctions that the proto-ad would have competed in. The proto-ad may then participate in a "replay" of such past auctions.

47 Claims, 6 Drawing Sheets

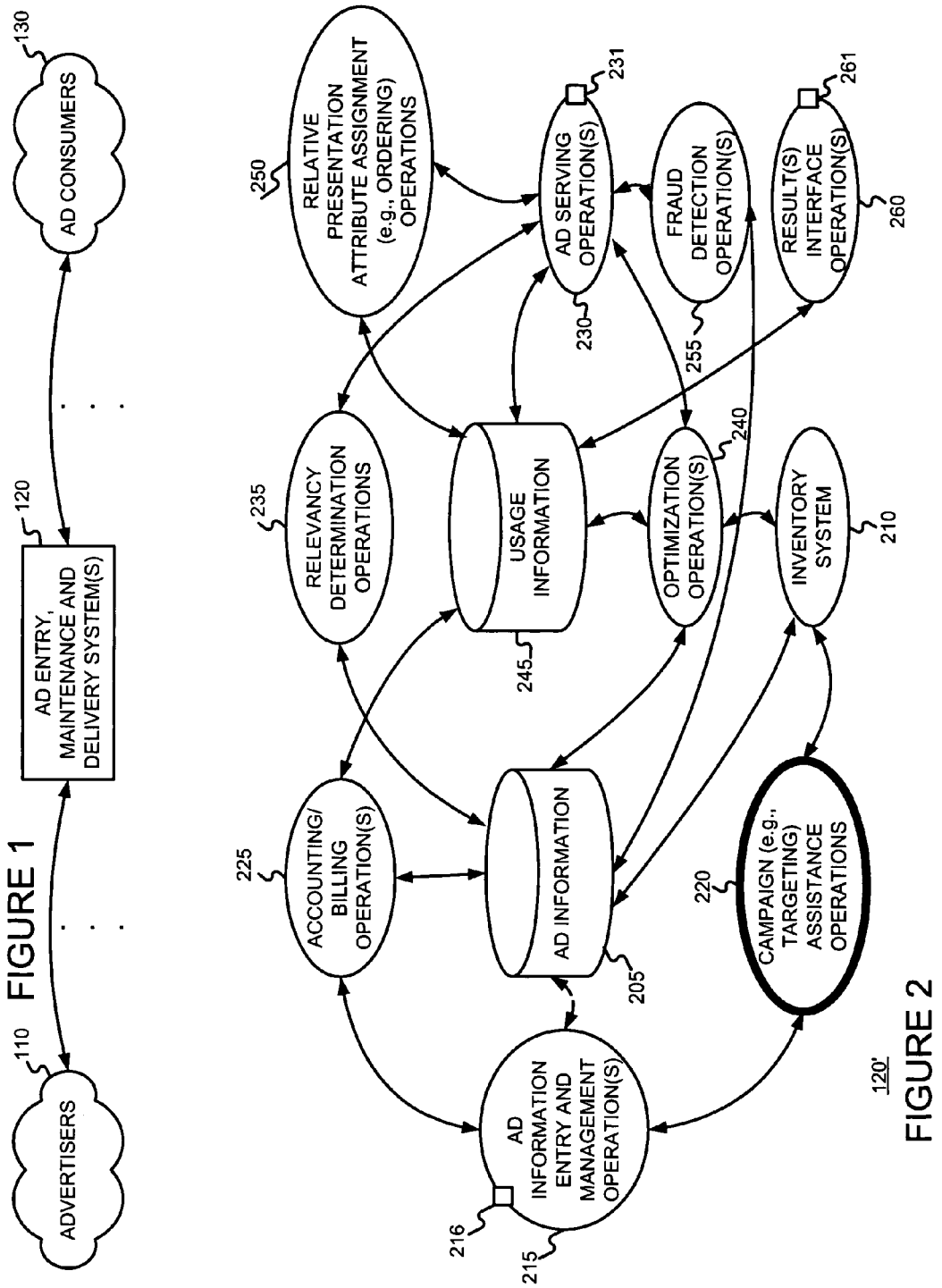

OFFER PRICE = $0.25

OFFER PRICE = $0.50

OFFER PRICE = $1.00

ESTIMATING COST AND/OR PERFORMANCE INFORMATION FOR AN ADVERTISEMENT IN AN ADVERTISING SYSTEM

§1. BACKGROUND OF THE INVENTION

§1.1 Field of the Invention

The present invention concerns advertising. In particular, the present invention concerns estimating cost and/or performance information for a candidate ad, and using such estimates to help advertisers.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering with a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time after the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment. Targeted ad serving has been used to increase the relevance, and consequently, the performance of online advertising. For example, search engines, such as Google, have enabled advertisers to target their ads so that they will be rendered with a search results page and so that they will be relevant, presumably, to the query that prompted the search results page. Other targeted advertising systems, such as those that target ads using e-mail information (See, e.g., the systems described in U.S. patent application Ser. No. 10/452,830 (incorporated herein by reference), titled "SERVING ADVERTISEMENTS USING INFORMATION ASSOCIATED WITH E-MAIL," filed on Jun. 2, 2003 and listing Jeffrey A. Dean, Georges R. Hark and Paul Bucheit as inventors.), or those that target ads using document content (See, e.g., U.S. patent application Ser. No. 10/375,900 (incorporated herein by reference), titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Hark, Deepak Jindal, and Narayanan Shivakumar as inventors.) may have similar challenges. That is, advertising systems would like to present advertisements that are relevant to the user requested information in general, and related to the current user interest in particular.

Such ad serving systems may serve ads in two steps. First, they may determine which ads are relevant to a given document request, search query, user, user location, etc. That is, they may determine which ads are eligible for serving. They may then score eligible ads using one or more factors such as the degree of relevance, offers (e.g., in terms of price offers, maximum price offers, etc.) made by the advertisers, ad performance, advertiser performance, user information, etc.

Generally, advertisers would like to know how their online advertising is performing, or how a hypothetical ad would likely perform. In fact, advertisers would like to be able to predict cost and/or performance information for one or more actual or hypothetical ads.

§2. SUMMARY OF THE INVENTION

The present invention may be used to provide (e.g., to an advertiser) fast and accurate estimates of the future cost and/or performance information for one or more actual or hypothetical ads (generally referred to as "proto-ads"). For example, in an online advertising system in which the serving of ads can be targeted using serving constraints, such as a set of one or more keywords (and perhaps other serving constraints such as a geographic area, a set of languages, and/or a user local time range, etc.), and in which the serving of ads is based, at least in part, on a cost per action (e.g., cost per impression, selection, conversion, etc.) offer, an advertiser may be provided with estimates of (i) how many selections (e.g., clicks) per time period (e.g., per day) their ad will get, (ii) what presentation attribute (e.g., average position, per-position counts, etc.) the ad will have, (iii) what the resulting cost over the time period will be, (iv) how many impressions per time period the ad will get, (v) what the selection rate of the ad will be, (vi) what the average cost per selection will be, etc. Similar information may be provided with respect to conversions. These estimates may be separated by keyword (or one or more other serving constraints), thereby providing useful information to the advertiser about how different keywords will affect the performance and cost of their ad campaign. Similarly, these estimates may be compiled over a number of alternative offers (e.g., price offers, maximum price offers, etc.).

In at least one embodiment of the present invention, past auction information may be used to simulate auctions that a proto-ad would have competed in. The proto-ad may then participate in a "replay" of such past auctions to generate one or more of (i) an average cost if selected (or if conversion occurred), (ii) an average position, (iii) per-position counts, (iv) per-rendering attribute counts, (v) impression counts, (vi) a cost per time period, (vii) average cost per impression, etc.

§3. BRIEF DESCRIPTION OF THE DRAWINGS

FIG. 1 is a diagram showing parties or entities that can interact with an advertising system.

FIG. 2 is a bubble chart of an exemplary advertising environment in which, or with which, the present invention may operate.

§4. DETAILED DESCRIPTION

Figure 3:
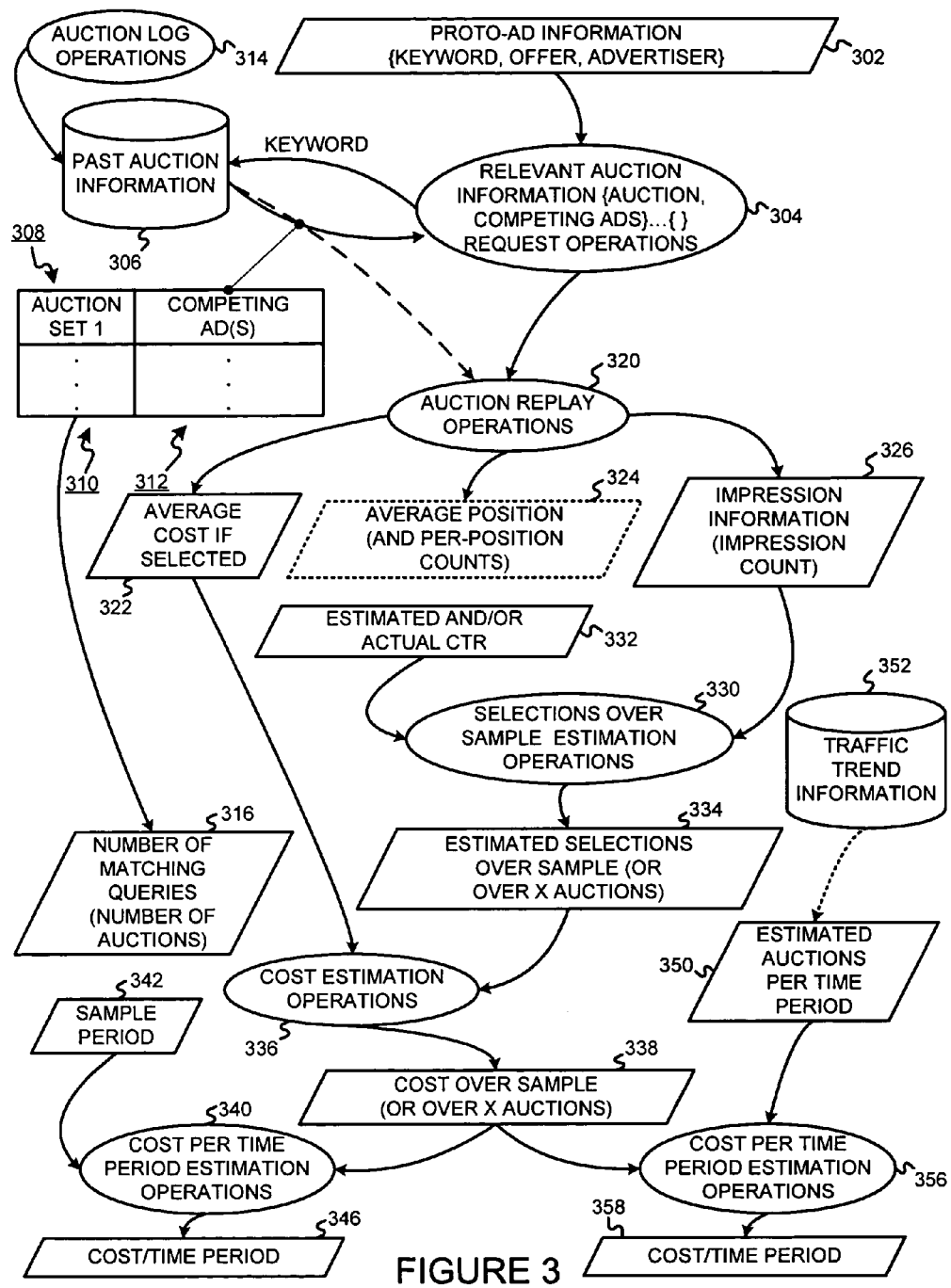
FIG. 3 is a bubble chart of operations that may be used to generate various cost and/or performance estimates for a proto-ad, in a manner consistent with the present invention.

The present invention may involve novel methods, apparatus, message formats and/or data structures for determining cost and/or performance estimates for an ad, such as a hypothetical ad. Such estimates may help an advertiser make more informed decisions about an ad or an ad campaign. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which the present invention may operate are described in §4.1. Then, exemplary embodiments of the present invention are described in §4.2. Finally, some conclusions regarding the present invention are set forth in §4.3.

§4.1 Environments in which, or with which, the Present Invention May Operate

§4.1.1 Exemplary Advertising Environment

FIG. 1 is a high level diagram of an advertising environment in which, or with which, the present invention may operate. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, user local time information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, selection or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, a user local time, etc.), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, selection or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

FIG. 2 illustrates an exemplary ad system 120', consistent with the present invention. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include a set of keywords, and a maximum price offer (cost per click-though, cost per conversion, etc.). Alternatively, or in addition, each ad group may include an average price offer (e.g., average cost per selection, average cost per conversion, etc.). Therefore, a single maximum price offer and/or a single average price offer may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

The present invention may be provided as one of the campaign assistance operations 220. It may use techniques used in the relevancy determination operations 235, the relative attribute assignment operations 250, and/or accounting/billing operations 225 to simulate various operations.

§4.1.3 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

Many of the following exemplary embodiments are described with respect to an online advertising system used by a search facility that provides search results in response to queries, such as the one described above in §4.1 for example. In the exemplary online advertising system, advertisements have one or more associated keywords used to target the serving of ads, typically defined by the advertiser. The advertisements may be served, perhaps subject to conditions and/or competition with other advertisements, if one or more of its keywords has a predefined relationship (e.g., a match) with terms or phrases of a query. In the exemplary embodiment, a performance parameter may be described as a selection rate, or a conversion rate. Ads may vie for position on a search results page. The relative position of competing ads is described as being a function of an offer and/or at least one performance parameter.

Although many of the exemplary embodiments are described in the context of the foregoing online advertising system, the present invention is not to be limited to such a system, and can be used with different systems. For example, an ad may be served in response to any ad serving trigger, not necessarily a search query. Accordingly, the present invention may be used in many online contexts, not necessarily a search engine Website. A keyword or keywords associated with an ad may be thought of more generally as a serving constraint. A relative position may be thought of more generally as a relative presentation attribute. A clickthrough rate or conversion rate may be thought of more generally as a user action, typically a user action responsive to a served ad. Any specific time periods described below can be thought of more generally as a relevant time period.

§4.2.1 General Operations

The present invention may be used to provide (e.g., an advertiser with) fast and accurate estimates of the future performance and/or cost information for an ad, such as a hypothetical ad. For example, in an online advertising system in which the serving of ads can be targeted using serving constraints, such as a set of one or more keywords (and perhaps other serving constraints such as a geographic area and/or a set of languages, etc.), and in which the serving of ads is based, at least in part, on a cost per action (e.g., cost per impression, selection, conversion, etc.) offer, many advertisers would like to know, among other things, (i) how many selections (e.g., clicks) per time period (e.g., per day) their ad will get, (ii) what presentation attribute (e.g., average position, per-position counts, etc.) the ad will have, (iii) what the resulting cost over the time period will be, (iv) how many impressions per time period the ad will get, (v) what the selection rate of the ad will be, (vi) what the average cost per selection will be for the ad, etc. Similar information may be provided with respect to conversions. These estimates may be separated by keyword (or one or more other serving constraints), thereby providing useful information to the advertiser about how different keywords will affect the performance and cost of their ad campaign. Similarly, these estimates may be compiled over a number of alternative offers (e.g., price offers, maximum price offers, etc.).

Often, the cost of an running an ad or an ad campaign including one or more ads over a given period of time (e.g., a week, a month, a quarter, a year, etc.) may be of utmost concern to an advertiser. In an ad system in which advertisers are billed only when their ad is selected, the cost may be a function of one or more of (i) a number of impressions of the ad over the given period, (ii) a selection rate of the ad over the given period, and (iii) (an average) cost per selection. The number of impressions may, in turn, be a function of ad spot inventory over the given period, as well as competition from other ads (e.g., of other advertisers). Similarly, the cost per selection may be a function of an offer of the ad and competition from other ads (e.g., of other advertisers). Thus, for each ad spot, there is a potential impression. If serving constraints are met and the ad wins a competition to be served, the potential impression becomes a realized impression. For each impression, there is a potential cost. If a selection (or conversion, etc.) occurs, the potential cost becomes a realized (i.e., billable) cost.

In the context of keyword-targeted ads, an estimate of ad spot inventory may be determined using one or more of (a) historic use of keywords in queries, (b) expected use of keywords in queries (which may account for overall trends, seasonal trends, etc.), and (c) other serving constraints. An estimate of competition may be determined using one or both of (a) current ad information, and (b) historic ad information. Finally, an estimate of a selection rate (or rate of some other action, such as conversion, which is a condition for billing the advertiser) may be determined using one or more of (a) the selection rate of other ads with the same keyword(s), (b) per partner selection rate, and (c) past selection rate for the ad under consideration (if the ad under consideration is an existing, running ad), (d) the selection rate of other ads with the similar keyword(s), etc. Any of the above selection rates may be adjusted for the average position, or another rendering attribute(s) of the ad. Alternatively, a selection rate can be determined for each auction and/or for the estimated position (or other rendering attribute) of the proto-ad for an auction. Then the average selection rate may be used as the selection rate of the proto-ad. Methods for estimating costs using (i) historic use of keywords in queries, (ii) current ad information of competing ads, and (iii) historic selection rate (e.g., click through rate) for campaigns with the same keywords are described in U.S. patent application Ser. No. 10/350,911 (incorporated herein by reference), titled "ESTIMATING INVENTORY, USER BEHAVIOR, AND/OR COST AND PRESENTATION ATTRIBUTES FOR AN ADVERTISEMENT FOR USE WITH AN ADVERTISING SYSTEM," filed on Jan. 24, 2003 and listing Magnus Sandburg, Eric Veach, John A. Bauer and Zhe Qian as inventors.

FIG. 3 is a bubble chart of operations that may be used to generate various estimates in a manner consistent with the present invention. In the following, an ad under consideration, such as a hypothetical ad for example, is simply referred to as a "proto-ad." Relevant auction information request operations 304 accept proto-ad information 302, which may include one or more targeting keywords and offer (e.g., price offer, maximum price offer, etc.) information. The proto-ad information 302 may also include advertiser information. In the following example, it is assumed that the proto-ad information 302 includes one targeting keyword, although the present invention is not limited to processing such proto-ads. The relevant auction information request operations 304 may use the keyword to query past auction information 306 for past auctions, as well as information about ads that were rendered as a result of the past auctions 308. The information about ads that were rendered as a result of past auctions 308 needed to replay the auction with the proto-ad participating may depend on the type of auction being replayed. Thus, for example, information from any auctions, over the relevant sample time period (e.g., a week), that were run in response to the keyword may be returned. Alternatively, information from a sample of such auctions may be returned. Such information may include one or more auctions 310, each of which may include information about competing ads 312 such as offers associated with the ads and/or performance of the ads. The past auction information 314 may have been compiled by auction logging operations 314. A number of matching queries (and therefore a number of auctions) over the time period of interest 316 may also be returned or otherwise derived.

The past auctions and information about ads that were rendered as a result of the past auctions 308 may be provided to auction replay operations 320, either directly, or via relevant auction request operations 304. In addition, the proto-ad information 302 is also provided to the auction replay operations 320. In this way, the auction replay operations 320 can be used to see if the proto-ad would have been served, and what the cost per action would have been (if such cost per action is a function of competing ads). The auction replay operation 320 may use any one of a number of different arbitration or auction techniques. Some exemplary auction techniques are described in: U.S. patent application Ser. No. 10/112,656 (incorporated herein by reference), titled "METHODS AND APPARATUS FOR ORDERING ADVERTISEMENTS BASED ON PERFORMANCE INFORMATION," filed on Mar. 29, 2002; U.S. patent application Ser. No. 10/112,654 (incorporated herein by reference), titled "METHODS AND APPARATUS FOR ORDERING ADVERTISEMENTS BASED ON PERFORMANCE INFORMATION AND PRICE INFORMATION," filed on Mar. 29, 2002; U.S. patent application Ser. No. 10/340,543 (incorporated herein by reference), titled "AUTOMATED PRICE MAINTENANCE FOR USE WITH A SYSTEM IN WHICH ADVERTISEMENTS ARE RENDERED WITH RELATIVE PREFERENCES," filed on Jan. 10, 2003; and U.S. patent application Ser. No. 10/340,542 (incorporated herein by reference), titled "AUTOMATED PRICE MAINTENANCE FOR USE WITH A SYSTEM IN WHICH ADVERTISEMENTS ARE RENDERED WITH RELATIVE PREFERENCES BASED ON PERFORMANCE INFORMATION AND PRICE INFORMATION," filed on Jan. 10, 2003.

After replaying the past auctions using the proto-ad information 302 and the information about the competing ads 312, the auction replay operations 320 may have compiled one or more of the following: average cost if selected of the proto-ad 322, average position (and perhaps per-position counts) of the proto-ad 324 and impression information (e.g., impression count) of the proto-ad 326. In one embodiment of the present invention, the average position 324 and/or the average cost if selected 322 of the proto-ad may be adjusted using current (as opposed to historical) competing ad information. Exemplary methods for performing auction replay operations 320 are described later in §4.2.2 below.

The average cost if clicked information 322 and the impression information 326 may be used to determine cost estimates as follows. Selections (e.g., clicks) over sample estimation operations 330 may use the impression information 326 and estimated and/or actual selection rate information 332 to generate estimated selections over the sample 334. Although not shown, alternatively, or in addition, actions (e.g., conversions) over sample estimation operations may use the impression information and estimated and/or actual action rate (e.g., conversion rate) information to generate estimated actions over the sample. The estimated and/or actual selection information 332 may be determined in a number of different ways, such as those described in U.S. patent application Ser. No. 10/350,910 (incorporated herein by reference), titled "ESTIMATING USER BEHAVIOR AND USING SUCH ESTIMATES," filed on Jan. 24, 2003 and listing Eric Veach as the inventor.

Cost estimation operations 336 may use the estimated selections over the sample 334 and the average cost if selected 322 to generate a total cost over the sample 338. For example, the cost estimation operations 336 may simply determine the total cost over the sample as follows:

Cost Over Sample=Average Cost if Selected×Estimated Selections Over Sample.

Cost per time period estimation operations 340 may use the cost over sample information 338 and sample period 342 to determine a cost over the time period 346. For example, the cost per time period estimation operations 240 may simply determine the cost over time period as follows:

Cost Over Time Period=Estimated Cost Over Sample/Sample Time Period.

Referring back to operations 330 and 336 and information 334 and 338, rather than estimate selections over a sample, and cost over a sample, selections over a number (Y) of auctions and costs over Y auctions may be estimated. Traffic trend information 352 may be used to estimate the number of relevant auctions over a given time period 350. Alternative cost per time period estimation operations 356 may use the cost over Y auctions information 338' and the estimated auctions per time period information 350 to determine the cost over the time period 358. For example, the cost per time period estimation operations 356 may simply determine the cost over time period as follows:

Cost Over Time Period=Estimated Cost Over Y Auctions×Estimated Auctions per Time Period.

Alternatively, although not shown, the cost over the time period may be determined as follows:

Cost Over Time Period=Average Cost Per Selection× Selections Per Time Period

Given the performance (e.g., impressions, selection rate, cost-per-selection, cost-per-time period, and average position) for the proto-ad generated, such information may be used as the prediction. Alternatively, these values may be adjusted using seasonality data (if such seasonal or temporal trends have not already been taken into account). Seasonality data may include one or more of the following:

(1) the seasonality of general traffic on the Web;
(2) the seasonality of general traffic at a search Website;
(3) the seasonality of general traffic at the Website that renders (e.g., displays) the ad;
(4) the seasonality of keyword-specific traffic at a search Website; and
(5) the seasonality of keyword-specific traffic at the Website that renders the ad.

Alternatively, seasonality can be accounted for using an appropriate selection of the sample of past auction information 306. Seasonality is interpreted to mean any temporal trends (such as daily, weekly, monthly, quarterly, seasonal, etc.)

§4.2.2 Exemplary Methods

Figure 4:
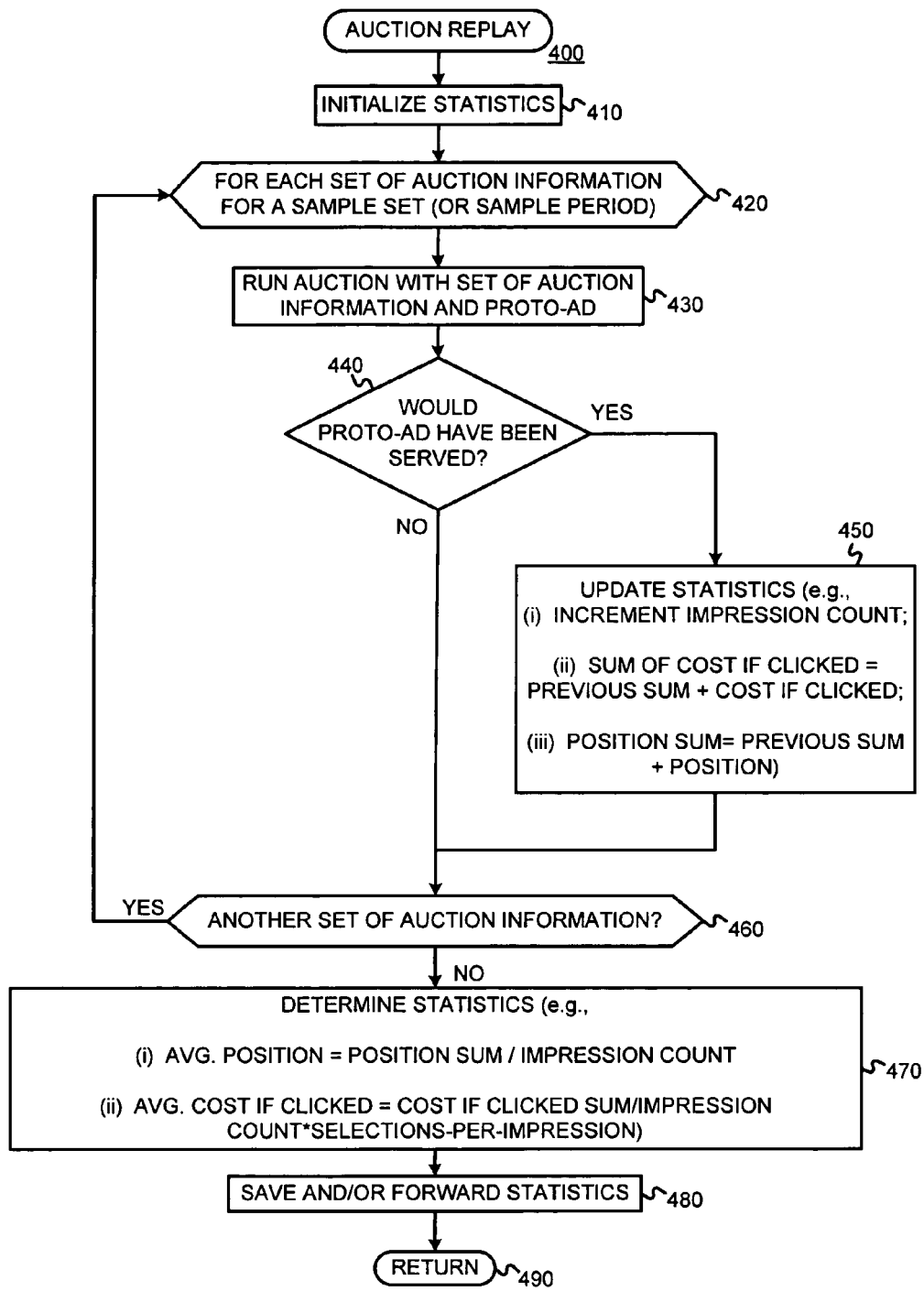
FIG. 4 is a flow diagram of an exemplary method that may be used to replay auctions in a manner consistent with the present invention.

Recall from FIG. 3 that auction replay operations 320 may be used to replay past auction using information from ads that competed in such auctions (and were served) and the proto-ad information. FIG. 4 is a flow diagram of a general exemplary method 400 that may be used to replay auctions in a manner consistent with the present invention. Statistics (or more generally, values) to be tracked are initialized (e.g., set to zero). (Block 410). As indicated by loop 420-460, a number of acts may be performed for each set of auction information returned. For example, the acts may be performed for each set of auction information over a given sample time period. Alternatively, since the sample set can be for a sub-set of all of the actions over the given sample time period (e.g., every tenth auction, every fifth auction, etc.), the acts may be performed for each set of auction information in the sample set.

The auction is run with the set of auction information and the proto-ad information. (Block 430) Thus, the proto-ad competes as it would have if it existed at the time of the auction. Note that ads that competed in the auction but that were not served need not be considered. It is then determined whether or not the proto-ad would have been served. (Decision block 440) If the proto-ad would not have been served, the method 400 continues to block 460. If, on the other hand, the proto-ad would have been served, various statistics for the proto-ad may be updated (Block 450), before the method 400 continues to block 460. For example, an impression count may be incremented. A sum of cost if clicked value may be set to the sum of the previous sum plus a cost if clicked. Note that the cost if clicked may depend on information of the competing ads of the auction. A position sum may be set to the sum of the previous position sum plus the current position (e.g., 1-10). Although not shown, counts for each of a number of positions may be tracked. For example, if the proto-ad is served in position=i, then a position_count_i is incremented (where i can be any number from 1 to the number of positions).

Referring to block 460, if more sets of auction information remain to be processed, the method 400 branches back to block 420 to process a next set of auction of information. If, on the other hand, all of the sets of auction information have been processed, various statistics for the proto-ad may be determined 470. For example, an average position of the proto-ad may be determined as the position sum divided by the impression count. Similarly, an average cost if clicked of the proto-ad may be determined as the cost if clicked sum divided by a product of the impression count and a selection rate. The determined statistics may be saved and/or forwarded (Block 480) before the method 400 is left (Node 490).

Figure 7:
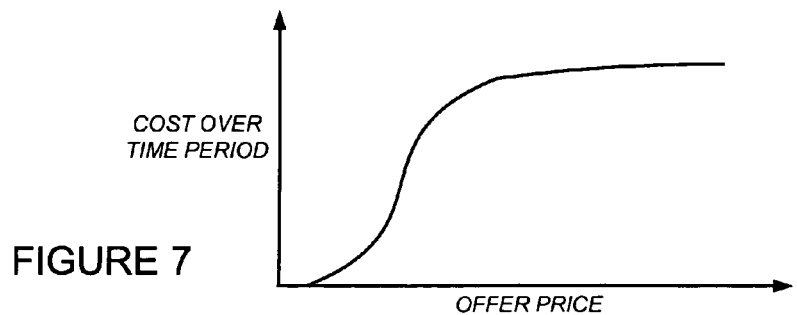
FIG. 7 is an exemplary output plot of cost over a time period as a function of offer price, consistent with the present invention, which may be provided to a user.
Figure 8A:
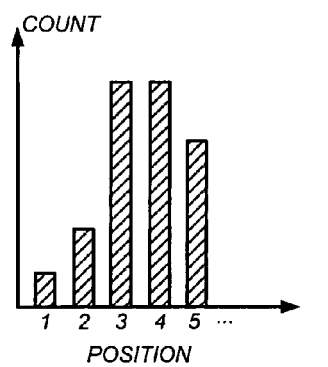
FIGS. 8a-8c are histograms of per-position counts for various offer amounts, consistent with the present invention, which may be provided to a user.
Figure 8B:
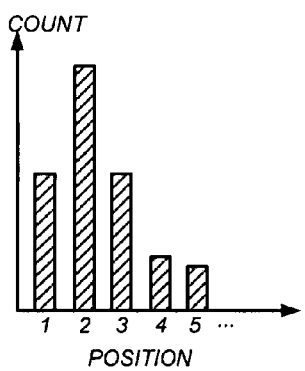
Figure 8C:
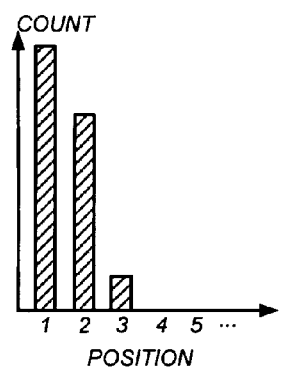

Although not shown, the proto-ad may include a number of alternative offers (e.g., price offers, maximum price offers, etc.). The method 400 may be run for one or more of the alternative offers to determine statistics for various alternative offers of the proto-ad. For example, referring back to block 480, the expected daily cost for a proto-ad across a range of offer prices may be determined and forwarded to a user. FIG. 7 illustrates an exemplary graphical display, for conveying the affect of changes of an offer price on the total period (e.g., daily) cost to an advertiser of the specified query. As offer price increases to the right, period cost also increases until it reaches a point of saturation. FIGS. 8a-8c illustrate another exemplary display in which position count histograms are provided for three different offer prices.

Other information that may be determined and provided may include one more of:
  Query inventory matching proto-ad (the number of queries that match the proto-ad which corresponds to the number of auctions (Recall 316.) that the proto-ad would have participated in);
  Cost versus offer amount. (Recall 345, 358, but determined at various offer prices.);
  Average position versus price offer amount. (Recall 324, but determined at various offer prices.);
  Histogram of position counts versus price offer amount (in addition to average position); and
  Change in ad serving entity revenue. Using the results of the simulated auctions, the additional revenue created by the proto-ad may be determined as the number of times that the new proto-ad is selected (on in a result page) multiplied by the average cost per selection, minus the loss of revenue from any displaced ad.

§4.2.3 Exemplary Apparatus

Figure 5:
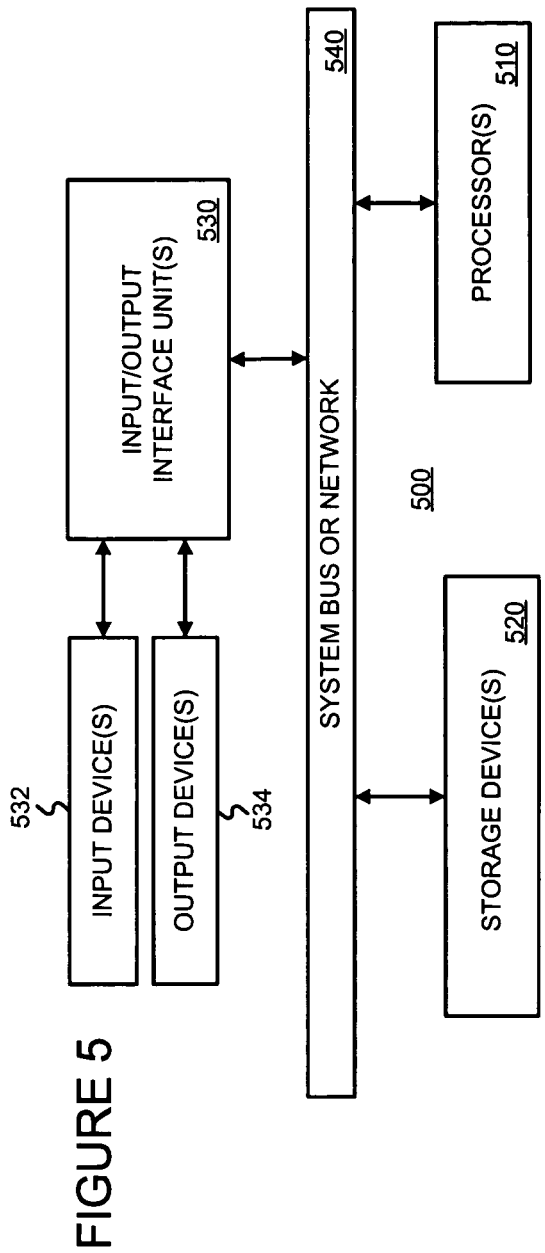
FIG. 5 is a block diagram of apparatus that may be used to perform at least some of the various operations and store some of the various data structures in a manner consistent with the present invention.

FIG. 5 is high-level block diagram of a machine 500 that may effect one or more of the operations discussed above. The machine 500 basically includes a processor(s) 510, an input/output interface unit(s) 530, a storage device(s) 520, and a system bus or network 540 for facilitating the communication of information among the coupled elements. An input device(s) 532 and an output device(s) 534 may be coupled with the input/output interface(s) 530.

The processor(s) 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 520 and/or may be received from an external source via an input interface unit 530.

In one embodiment, the machine 500 may be one or more conventional personal computers. In this case, the processing unit(s) 510 may be one or more microprocessors. The bus 540 may include a system bus. The storage devices 520 may include system memory, such as read only memory (ROM) and/or random access memory (RAM). The storage device(s) 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540.

The output device(s) 534 may include a monitor or other type of display device, which may also be connected to the system bus 540 via an appropriate interface. In addition to (or instead of) the monitor, the personal computer may include other (peripheral) output devices (not shown), such as speakers and printers for example.

§4.2.4 Alternatives and Refinements

The present invention can also be used for ads using serving constraints in addition to, or instead of, keywords, such as language, geolocation (e.g., country), user local time, etc.). In such an embodiment, the proto-ad information 302 may include serving constraints in addition to, or instead of, the keyword(s), and additional information about past auctions 306 may need to be stored.

To improve performance speed of the estimate determinations using auction replays, keyword (and/or category) indexes may be used to provide fast access for the historical logs. In this way, the relevant auction information request operations 304 may look up the specific keywords (and/or categories) in the index, load the appropriate entries from the sampled logs files, and pass them to the auction replay operations 320 as appropriate. For example, the past auction information 306 may be sorted by keyword, where each keyword has one or more sets of information about competing ads corresponding to one or more past auctions triggered by the keyword.

Figure 6:
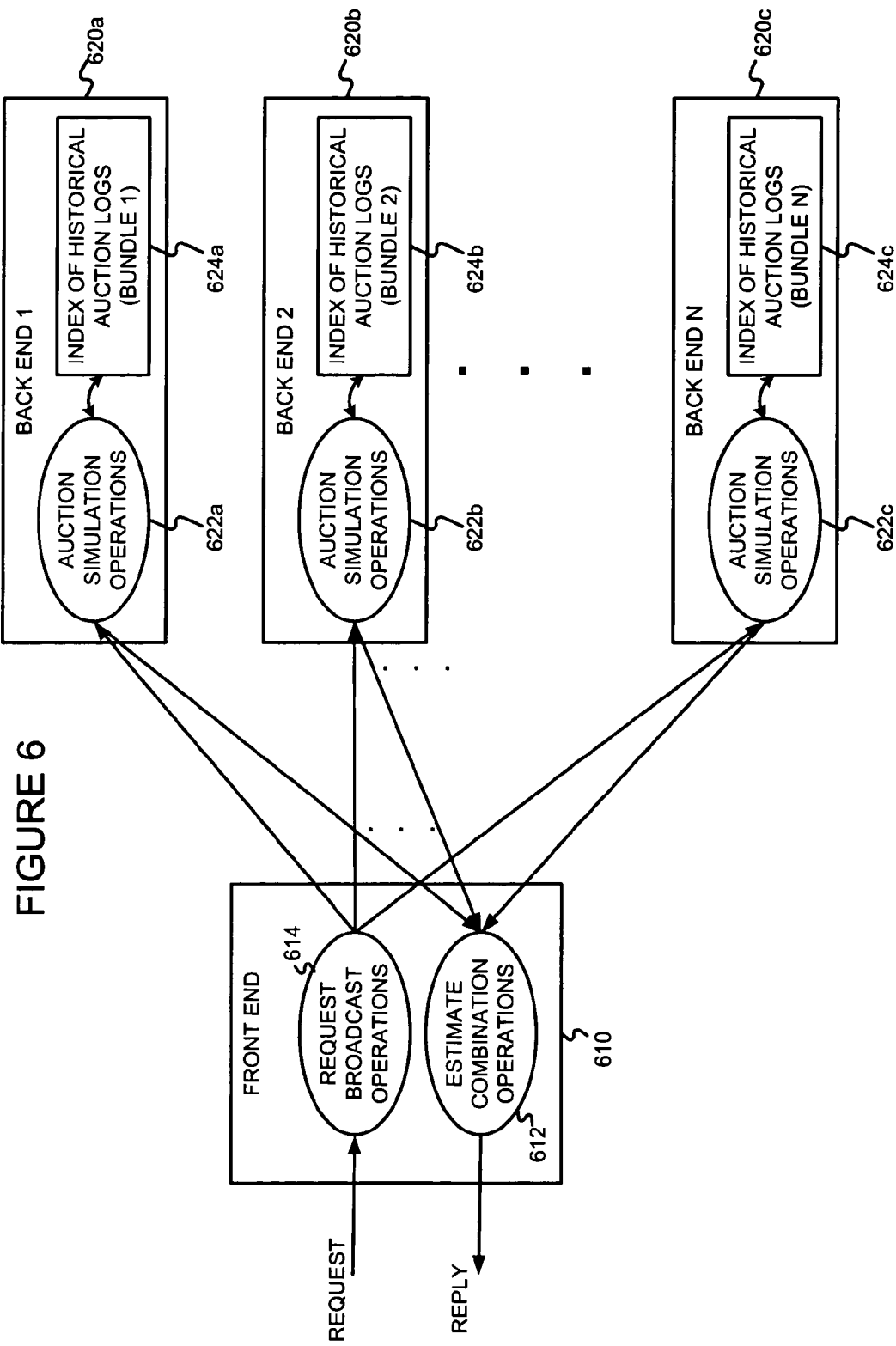
FIG. 6 is a block diagram of an exemplary distributed architecture that may be used to perform at least some of the various operations and store at least some of the various data structures in a manner consistent with the present invention.

FIG. 6 is a block diagram of an exemplary distributed architecture that may be used to effect at least some of the various operations and store at least some of the various data structures in a manner consistent with the present invention. A front-end machine 610 may be used to provide a user interface to receive user requests (e.g., including proto-ad information for which estimates are to be generated) and provide replies (e.g., with one or more cost and/or performance estimates) to the user. Request broadcast operations 614 may operate to forward instances of the user request to an appropriate set of back-end machines 620. The back-end machines 620 accept the request instances and auction simulation operations 622 may run the request instances against historical logs 624. Note that the aggregate historical logs 624 are distributed over the set of back-end machines 620 in order to allow replies to a request to be determined in parallel. More specifically, when a specific back-end machine 620 receives a request, auction simulation operations 622 may use proto-ad information in the request to perform a set of simulated ad auctions over the matching entries in its portion of the historical logs 624. Using the results of these simulated auctions, the back-end machine 620 may then return its estimate(s) to the front-end machine 610. Estimate combination operations 612 of the front-end machine 610 may then combine the results from the back-end machines 620 into a single reply to be advanced to the user.

In some embodiments of the present invention, the distributed auction log may be structured so that the sampled historical auction logs are saved in sets of daily bundles. As each day passes, a new bundle may simply replace the oldest bundle in the system. To facilitate distribution and replication, the index for each bundle should be less than the standard memory size of the back-end machines 620. Bundles may be assigned to one or more back-end machines 620 such that each back-end machine 620 can fit all of its assigned bundle indexes in memory. The request broadcast operations 614 of the front-end machine 610 may be responsible for ensuring that a request is directed to the appropriate back-end machines 620 such that the request is executed against each bundle in the aggregate log.

§4.3 Conclusions

As can be appreciated from the foregoing disclosure, the present invention permits advertisers to predict cost and/or performance information for one or more ads, such as hypothetical ads.

What is claimed is:

1. A method comprising:
receiving, by at least one processor, proto-ad information for a proto-ad, the proto-ad information including a plurality of offer amounts corresponding to the proto-ad;
receiving, by at least one processor, past auction information corresponding to past auctions based on the received proto-ad information;
receiving, by at least one processor, traffic trend information based on the received proto-ad information;
replaying, by at least one processor, past auctions using a first offer amount associated with the received proto-ad information and the received past auction information to generate first auction result information;
determining, by at least one processor and based on the first auction result information, a first performance estimate for the proto-ad associated with the first offer amount;
adjusting, by at least one processor, the first performance estimate associated with the first offer amount for the proto-ad based on the received traffic trend information;
replaying, by at least one processor, past auctions using a second offer amount different from the first offer amount and associated with the received proto-ad information and the received past auction information to generate second auction result information;
determining, by at least one processor and based on the second auction result information, a second performance estimate for the proto-ad associated with the second offer amount;
adjusting, by at least one processor, the second performance estimate for the second offer amount for the proto-ad based on the received traffic trend information; and
forwarding, by at least one processor, the adjusted first performance estimate associated with the first offer amount and the adjusted second performance estimate associated with the second offer amount.

2. The method of claim 1 wherein the proto-ad information includes a targeting keyword, and wherein the past auction information is received using the targeting keyword.

3. The method of claim 1 wherein the proto-ad information includes a targeting topic, and wherein the past auction information is received using the targeting topic.

4. The method of claim 1 wherein the proto-ad information includes a set of one or more serving constraints, and wherein the past auction information is received using the set of one or more serving constraints.

5. The method of claim 1 wherein the traffic trend information includes at least one of (a) a seasonality of general traffic on the Web, (b) a seasonality of general traffic at a search Website, (c) a seasonality of general traffic at a Website with which the ad will be rendered, (d) a seasonality of keyword-specific traffic at a search Website, and (e) a seasonality of keyword-specific traffic at a Website with which the ad will be rendered.

6. The method of claim 1 wherein the at least one processor comprises at least two processors, wherein replaying the past auctions using the first offer amount associated with the received proto-ad information and the received past auction information to generate the first auction result information comprises each of the at least two processors:
receiving a portion of the past auction information using the received proto-ad information,
replaying past auctions using the first offer amount associated with the received proto-ad information and the received portion of the past auction information to generate auction result information, and
generating the first auction result information using the auction result information.

7. The method of claim 1 wherein each of the first offer amount and the second offer amount is a price per selection.

8. The method of claim 1 wherein each of the first offer amount and the second offer amount is a price per conversion.

9. The method of claim 1 wherein each of the first offer amount and the second offer amount is a maximum price per selection.

10. The method of claim 1 wherein each of the first offer amount and the second offer amount is a maximum price per conversion.

11. The method of claim 1 further comprising:
adjusting the first estimate and the second estimate for the proto-ad using other proto-ad information.

12. A method comprising:
receiving, by at least one processor, proto-ad information for a proto-ad;
receiving, by at least one processor, sets of past auction information based on the received proto-ad information;
receiving, by at least one processor, traffic trend information based on the received proto-ad information;
for each of the sets of past auction information:
replaying, by at least one processor, a past auction included in a set of past auction information using a first offer amount associated with the received proto-ad information to generate first auction result information, determining, by at least one processor and based on the first auction result information, a number of times that the proto-ad would have been presented for the first offer amount, and updating, by at least one processor and based on the number of times that the proto ad would have been presented for the first offer amount, first proto-ad estimate information;

determining, by at least one processor and based on the first proto ad estimate information, a first performance estimate for the proto-ad associated with the first offer amount;

adjusting, by at least one processor, the first performance estimate associated with the first offer amount for the proto-ad based on the received traffic trend information;

for each of the sets of past auction information:

replaying, by at least one processor, a past auction included in a set of past auction information using a second offer amount different from the first offer amount and associated with the received proto-ad information to generate second auction result information, determining, by at least one processor and based on the second auction result information, a number of times that the proto-ad would have been presented for the second offer amount, and updating, by at least one processor and based on the number of times that the proto ad would have been presented for the second offer amount, second proto-ad estimate information;

determining, by at least one processor and based on the second proto ad estimate information, a second performance estimate for the proto-ad associated with the second offer amount;

adjusting, by at least one processor, the second performance estimate associated with the second offer amount for the proto-ad based on the received traffic trend information; and forwarding, by at least one processor, the adjusted first performance estimate associated with the first offer amount and the adjusted second performance estimate associated with the second offer amount.

13. The method of claim 12 wherein updating the first proto ad estimate information and the second proto-ad estimate information comprises incrementing an impression count.

14. The method of claim 12 wherein updating the first proto ad estimate information and the second proto-ad estimate information comprises determining a sum of cost if selected to be a previous sum of cost if selected plus a cost if selected of the proto-ad in the replayed past auction.

15. The method of claim 14 wherein updating the first proto ad estimate information and the second proto-ad estimate information further comprises incrementing an impression count, and wherein an estimate of cost is determined using the impression count, the sum of the cost if selected, and an estimated selection rate.

16. The method of claim 12 wherein updating the first proto ad estimate information and the second proto-ad estimate information comprises determining a position sum to be a previous position sum plus a position of the proto-ad in the replayed past auction.

17. The method of claim 16 wherein updating the first proto ad estimate information and the second proto-ad estimate information further comprises incrementing an impression count, and wherein an estimate of average position is determined using the impression count and the position sum.

18. An apparatus comprising one or more processors connected to a storage device, wherein the one or more processors are configured to:

receive proto-ad information for a proto-ad;

receive past auction information based on the received proto-ad information;

receive traffic trend information based on the received proto-ad information;

replay past auctions using a first offer amount associated with the received proto-ad information and the received past auction information to generate first auction result information;

determine, based on the first auction result information, a first performance estimate for the proto-ad associated with the first offer amount, adjust the first performance estimate associated with the first offer amount for the proto-ad based on the received traffic trend information;

replay past auctions using a second offer amount different from the first offer amount and associated with the received proto-ad information and the received past auction information to generate second auction result information;

determine, based on the second auction result information, a second performance estimate for the proto-ad associated with the second offer amount;

adjust the second performance estimate for the second offer amount for the proto-ad based on the received traffic trend information; and forward the adjusted first performance estimate associated with the first offer amount and the adjusted second performance estimate associated with the second offer amount.

19. The apparatus of claim 18 wherein the proto-ad information includes a targeting keyword, and wherein the one or more processors are configured to receive the past auction information using the targeting keyword.

20. The apparatus of claim 18 wherein the proto-ad information includes a targeting topic, and wherein the one or more processors are configured to receive the past auction information using the targeting topic.

21. The apparatus of claim 18 wherein the proto-ad information includes a set of one or more serving constraints, and wherein the one or more processors are configured to receive the past auction information using the set of one or more serving constraints.

22. The apparatus of claim 18 wherein the traffic trend information includes at least one of (a) a seasonality of general traffic on the Web, (b) a seasonality of general traffic at a search Website, (c) a seasonality of general traffic at a Website with which the ad will be rendered, (d) a seasonality of keyword-specific traffic at a search Website, and (e) a seasonality of keyword-specific traffic at a Website with which the ad will be rendered.

23. The apparatus of claim 18 wherein the one or more processors comprise at least two processors, wherein each of the processors is configured to replay the past auctions using the first offer amount associated with the received proto ad information and the received past auction information to generate first auction result information by:

receiving a portion of the past auction information using the received proto-ad information, replaying past auctions using the first offer amount associated with the received proto-ad information and the received portion of the past auction information to generate auction result information, and
generating the first auction result information using the auction result information.

24. The apparatus of claim 18 wherein each of the first offer amount and the second offer amount is a price per selection.

25. The apparatus of claim 18 wherein each of the first offer amount and the second offer amount is a price per conversion.

26. The apparatus of claim 18 wherein each of the first offer amount and the second offer amount is a maximum price per selection.

27. The apparatus of claim 18 wherein each of the first offer amount and the second offer amount is a maximum price per conversion.

28. The apparatus of claim 18, wherein the one or more processors are further configured to:
adjust the first estimate and the second estimate for the proto-ad using other proto-ad information.

29. An apparatus comprising one or more processors connected to a storage device, wherein the one or more processors are configured to:
receive proto-ad information for a proto-ad,
receive sets of past auction information based on the received proto-ad information, and
receive traffic trend information based on the received proto-ad information;
for each of the sets of past auction information:
replay a past auction included in a set of past auction information using a first offer amount associated with the received proto-ad information to generate first auction result information,
determine, based on the first auction result information, a number of times that the proto-ad would have been presented for the first offer amount, and
update, based on the number of times that the proto ad would have been presented for the first offer amount, first proto-ad estimate information;
determine, based on the first proto ad estimate information, a first performance estimate for the proto-ad associated with the first offer amount;
adjust the first performance estimate associated with the first offer amount for the proto-ad based on the received traffic trend information;
for each of the sets of past auction information:
replay a past auction included in a set of past auction information using a second offer amount different from the first offer amount and associated with the received proto-ad information to generate second auction result information,
determine, based on the second auction result information, a number of times that the proto-ad would have been presented for the second offer amount, and
update, based on the number of times that the proto ad would have been presented for the second offer amount, second proto-ad estimate information;
determine, based on the second proto ad estimate information, a second performance estimate for the proto-ad associated with the second offer amount;
adjust the second performance estimate associated with the second offer amount for the proto-ad based on the received traffic trend information; and
forward the adjusted first performance estimate associated with the first offer amount and the adjusted second performance estimate associated with the second offer amount.

30. The apparatus of claim 29 wherein the one or more processors are configured to update the first proto ad estimate information and the second proto-ad estimate information by incrementing an impression count.

31. The apparatus of claim 29 wherein the one or more processors are configured to update the first proto ad estimate information and the second proto-ad estimate information by determining a sum of cost if selected to be a previous sum of cost if selected plus a cost if selected of the proto-ad in the replayed past auction.

32. The apparatus of claim 31 wherein the one or more processors are configured to update the first proto ad estimate information and the second proto-ad estimate information by incrementing an impression count, and wherein an estimate of cost is determined using the impression count, the sum of the cost if selected, and an estimated selection rate.

33. The apparatus of claim 29 wherein the one or more processors are configured to update the first proto ad estimate information and the second proto-ad estimate information by determining a position sum to be a previous position sum plus a position of the proto-ad in the replayed past auction.

34. The apparatus of claim 33 wherein the one or more processors are configured to update the first proto ad estimate information and the second proto-ad estimate information by incrementing an impression count, and wherein an estimate of average position is determined using the impression count and the position sum.

35. The method of claim 1, wherein:
replaying the past auctions using the first offer amount associated with the received proto-ad information and the received past auction information to generate the first auction result information comprises:
comparing the first offer amount to other offer amounts included in the received past auction information, and
determining, based on the comparison of the first offer amount to the other offer amounts included in the received past auction information, a number of times that the proto-ad would have been presented for the first offer amount;
determining, based on the first auction result information, the first performance estimate comprises determining, based on the number of times that the proto-ad would have been presented for the first offer amount, the first performance estimate;
replaying the past auctions using the second offer amount associated with the received proto-ad information and the received past auction information to generate the second auction result information comprises:
comparing the second offer amount to the other offer amounts included in the received past auction information, and
determining, based on the comparison of the second offer amount to the other offer amounts included in the received past auction information, a number of times that the proto-ad would have been presented for the second offer amount; and
determining, based on the second auction result information, the second performance estimate comprises determining, based on the a number of times that the proto-ad would have been presented for the second offer amount, the second performance estimate.

36. The method of claim 35, wherein:
determining, based on the number of times that the proto-ad would have been presented for the first offer amount, the first performance estimate comprises determining, only based on the a number of times that the proto-ad would have been presented for the first offer amount, the first performance estimate; and determining, based on the number of times that the proto-ad would have been presented for the second offer amount, the second performance estimate comprises determining, only based on the a number of times that the proto-ad would have been presented for the second offer amount, the second performance estimate.

37. The method of claim 1, wherein the first performance estimate associated with the first offer amount comprises at least of an average cost if selected, an average cost if converted, an average position, per position counts, an impression count, a cost per time period, selections per time period, conversions per time period, a cost over sample, selections over sample, and conversions over sample.

38. The method of claim 1, wherein the second performance estimate associated with the second offer amount comprises at least of an average cost if selected, an average cost if converted, an average position, per position counts, an impression count, a cost per time period, selections per time period, conversions per time period, a cost over sample, selections over sample, and conversions over sample.

39. The method of claim 1, wherein forwarding the adjusted first performance estimate associated with the first offer amount and the adjusted second performance estimate associated with the second offer amount comprises enabling display of the adjusted first performance estimate associated with the first offer amount and the adjusted second performance estimate associated with the second offer amount.

40. The method of claim 39, wherein enabling display of the adjusted first performance estimate associated with the first offer amount and the adjusted second performance estimate associated with the second offer amount comprises simultaneously enabling display of the adjusted first performance estimate relative to the first offer amount and the adjusted second performance estimate relative to the second offer amount.

41. The apparatus of claim 18, wherein the first performance estimate associated with the first offer amount comprises at least of an average cost if selected, an average cost if converted, an average position, per position counts, an impression count, a cost per time period, selections per time period, conversions per time period, a cost over sample, selections over sample, and conversions over sample.

42. The apparatus of claim 18, wherein the second performance estimate associated with the second offer amount comprises at least of an average cost if selected, an average cost if converted, an average position, per position counts, an impression count, a cost per time period, selections per time period, conversions per time period, a cost over sample, selections over sample, and conversions over sample.

43. The method of claim 5, wherein (a) the seasonality of general traffic on the Web comprises a trend of general traffic on the Web over a predetermined time period, (b) the seasonality of general traffic at the search Website comprises a trend of general traffic at the search Website over a predetermined time period, (c) the seasonality of general traffic at the Website with which the ad will be rendered comprises a trend of general traffic at the Website with which the ad will be rendered over a predetermined time period, (d) the seasonality of keyword-specific traffic at the search Website comprises a trend of keyword-specific traffic at the search Website over a predetermined time period, and (e) the seasonality of keyword-specific traffic at the Website with which the ad will be rendered comprises a trend of keyword-specific traffic at the Website with which the ad will be rendered over a predetermined time period.

44. The method of claim 37 wherein the estimated cost per time period for the proto-ad is determined using an estimated average cost if selected, an estimated impression count, an estimated selection rate, and a sample period.

45. The method of claim 37 wherein the estimated cost per time period for the proto-ad is determined using an estimated average cost if selected, an estimated impression count over a number of auctions, an estimated selection rate, and an estimated number of auctions per time period.

46. The apparatus of claim 41 wherein the one or more processors are configured to determine the estimated cost per time period for the proto-ad using an estimated average cost if selected, an estimated impression count, an estimated selection rate, and a sample period.

47. The apparatus of claim 41 wherein the one or more processors are configured to determine the estimated cost per time period for the proto-ad using an estimated average cost if selected, an estimated impression count over a number of auctions, an estimated selection rate, and an estimated number of auctions per time period.

* * * * *